(12) United States Patent
Numoto

(10) Patent No.: US 8,469,398 B2
(45) Date of Patent: Jun. 25, 2013

(54) GAS GENERATOR

(75) Inventor: Kenji Numoto, Hyogo (JP)

(73) Assignee: Daicel Chemical Industries, Ltd., Osaka (JP)

( * ) Notice: Subject to any disclaimer, the term of this patent is extended or adjusted under 35 U.S.C. 154(b) by 106 days.

(21) Appl. No.: 13/088,483

(22) Filed: Apr. 18, 2011

(65) Prior Publication Data

US 2011/0254254 A1    Oct. 20, 2011

Related U.S. Application Data

(60) Provisional application No. 61/326,085, filed on Apr. 20, 2010.

(30) Foreign Application Priority Data

Apr. 19, 2010  (JP) ................................. 2010-095622

(51) Int. Cl.
    *B60R 21/26*    (2011.01)
(52) U.S. Cl.
    USPC ........................... 280/736; 280/741; 102/530
(58) Field of Classification Search
    USPC ........................... 102/530–531; 280/736, 741
    See application file for complete search history.

(56) References Cited

U.S. PATENT DOCUMENTS

| | | | |
|---|---|---|---|
| 5,269,561 A | | 12/1993 | Davis et al. |
| 5,556,439 A | * | 9/1996 | Rink et al. ...................... 55/487 |
| 5,564,743 A | * | 10/1996 | Marchant ...................... 280/741 |
| 5,934,705 A | * | 8/1999 | Siddiqui et al. ............... 280/736 |
| 6,095,561 A | * | 8/2000 | Siddiqui et al. ............... 280/742 |
| 6,149,193 A | * | 11/2000 | Canterberry et al. ......... 280/741 |
| 6,464,254 B2 | * | 10/2002 | Chikaraishi et al. .......... 280/741 |
| 6,547,275 B2 | * | 4/2003 | Nakashima et al. .......... 280/736 |
| 6,547,277 B1 | * | 4/2003 | Adamini et al. ............... 280/741 |
| 6,598,901 B2 | * | 7/2003 | Nakashima et al. .......... 280/736 |
| 6,857,658 B2 | * | 2/2005 | Iwai et al. ...................... 280/741 |
| 6,948,737 B2 | | 9/2005 | Ohji et al. |
| 6,948,787 B2 | * | 9/2005 | McBrayer et al. ............. 312/258 |
| 7,007,973 B2 | * | 3/2006 | Canterberry et al. ......... 280/741 |
| 7,175,197 B2 | * | 2/2007 | Iwai et al. ...................... 280/736 |
| 7,537,240 B2 | * | 5/2009 | Blackburn ..................... 280/741 |
| 2005/0194772 A1 | * | 9/2005 | Numoto et al. ................ 280/741 |
| 2007/0013179 A1 | * | 1/2007 | Numoto et al. ................ 280/741 |
| 2007/0024038 A1 | * | 2/2007 | Numoto et al. ................ 280/736 |
| 2009/0121464 A1 | * | 5/2009 | Numoto et al. ................ 280/741 |

FOREIGN PATENT DOCUMENTS

| | | |
|---|---|---|
| EP | 1 407 944 A1 | 4/2004 |
| FR | 2 888 548 A1 | 1/2007 |
| GB | 2 257 951 A | 1/1993 |
| JP | 6-183310 A | 7/1994 |
| JP | 2003-191816 A | 7/2003 |
| WO | WO 2007/006802 A2 | 1/2007 |

\* cited by examiner

*Primary Examiner* — Joseph Rocca
*Assistant Examiner* — James English
(74) *Attorney, Agent, or Firm* — Birch, Stewart, Kolasch & Birch, LLP

(57) ABSTRACT

A gas generator includes,
  a tubular housing including, on a circumferential surface thereof, first and second gas discharge port groups, the second gas discharge port group being separated axially from the first gas discharge port group, both being closed by a seal member,
  a first closing member having an ignition device and a second closing member, closing one end and the other end of the tubular housing, respectively,
  opening pressures $P_1$ and $P_2$ for opening the first and second gas discharge port groups, satisfying a relationship $P_1 < P_2$,
  the first gas discharge port group being positioned at a center portion in the axial direction of the tubular housing or in the vicinity thereof, and the second gas discharge port group being positioned at a center portion between the first gas discharge port group and the second closing member or in the vicinity thereof, respectively.

3 Claims, 3 Drawing Sheets

GAS GENERATOR

This nonprovisional application claims priority under 35 U.S.C. §119(a) to Patent Application No. 2010-95622 filed in Japan on 19 Apr. 2010 and 35 U.S.C. §119 (e) to U.S. Provisional Application No. 61/326085 filed on 20 Apr. 2010, both of which are incorporated by reference.

BACKGROUND OF INVENTION

1. Field of Invention

The present invention relates to a gas generator used in a restraining device installed in a vehicle and the like.

2. Description of Related Art

Gas generators used in air bag systems or the like and, in particular, gas generators that use a solid gas generating agent as an operative gas source, adopt a structure for controlling inner combustion pressure in order to finely adjust output performance. Even with a same gas generator, sometimes output pressure differs particularly depending on an environmental temperature at activation of the gas generator. This is because a burning rate (reaction rate) of a gas generating agent varies depending on the environmental temperature and, generally, the higher the temperature is, the faster the combustion becomes. Here, an environmental temperature refers to a temperature according to season, region, a state of a vehicle (for example, whether the vehicle is parked in a shade or under the sun), and the like.

Attempts are being made to suppress a variation in output pressure due to a difference in such environmental temperatures.

FIG. 3 in JP-A No. 6-183310 shows a gas generator 22 with an elongated housing. A large-diameter orifice 26 and a small-diameter orifice 28 are formed at two locations that face each other on a peripheral wall of a housing 24 and are respectively closed by foils 32. In addition, intermediate-diameter orifices 34 are formed at equal intervals in the circumferential direction at an end portion of the housing 24, and the intermediate-diameter orifices 34 are closed by foils 36 that are thicker than the foils 32.

SUMMARY of INVENTION

The present invention provides a gas generator including:

a tubular housing having both ends closed and a gas discharge port on a circumferential surface, and forming an outer shell of the gas generator, a first closing member having an ignition device fixed thereto and closing one end of the tubular housing, a second closing member closing another end of the tubular housing, a combustion chamber defined inside the tubular housing and charged with a gas generating agent, the gas discharge port including at least two gas discharge port groups, the at least two gas discharge port groups including a first gas discharge port group formed in the circumferential direction of the tubular housing and closed, from the inside, by a seal member, and a second gas discharge port group separated in the axial direction from the first gas discharge port group, formed in the circumferential direction of the tubular housing and closed, from the inside, by a seal member, pressure (opening pressure $P_1$), that is necessary for opening the first gas discharge port group, and pressure (opening pressure $P_2$), that is necessary for opening the second gas discharge port group, satisfying a relationship of $P_1 < P_2$, the first gas discharge port group being positioned at a center portion in the axial direction between the first closing member and the second closing member, or in the vicinity thereof, and the second gas discharge port group being positioned at a center portion in the axial direction between the first gas discharge port group and the second closing member, or in the vicinity thereof.

The present invention also provides a gas generator including:

a tubular housing having both ends closed and a gas discharge port on a circumferential surface, and forming an outer shell of the gas generator, a first closing member having an ignition device fixed thereto and closing one end of the tubular housing, a second closing member closing another end of the tubular housing, and a partition member dividing a space between the first closing member and the second closing member, among spaces divided by the partition member, a space that is closer to the first closing member and the ignition device, serving as a first combustion chamber charged with a first gas generating agent, a space that is closer to the second closing member, serving as a second combustion chamber charged with a second gas generating agent, the spaces satisfying a relationship where capacity of the first combustion chamber $\geq$ capacity of the second combustion chamber, the gas discharge port, that is formed in a side of the first combustion chamber, including at least two gas discharge port groups, the at least two gas discharge port groups including a first gas discharge port group formed in the circumferential direction of the tubular housing and closed, from the inside, by a seal member, and a second gas discharge port group separated axially from the first gas discharge port group, formed in the circumferential direction of the tubular housing and closed, from the inside, by a seal member, pressure (opening pressure $P_1$), that is necessary for opening the first gas discharge port group, and pressure (opening pressure $P_2$), that is necessary for opening the second gas discharge port group, satisfying a relationship of $P_1 < P_2$, the first gas discharge port group being positioned at a center portion in the axial direction between the first closing member and the partition member, or in the vicinity thereof, and the second gas discharge port group being positioned at a center portion in the axial direction between the first gas discharge port group and the partition member, or in the vicinity thereof.

BRIEF DESCRIPTION OF THE DRAWINGS

The present invention will be become more fully understood from the detailed description given hereinbelow and the accompanying drawings which are given by way of illustration only, and thus are not limitative of the present invention and wherein.

DETAILED DESCRIPTION OF INVENTION

Figure 1:
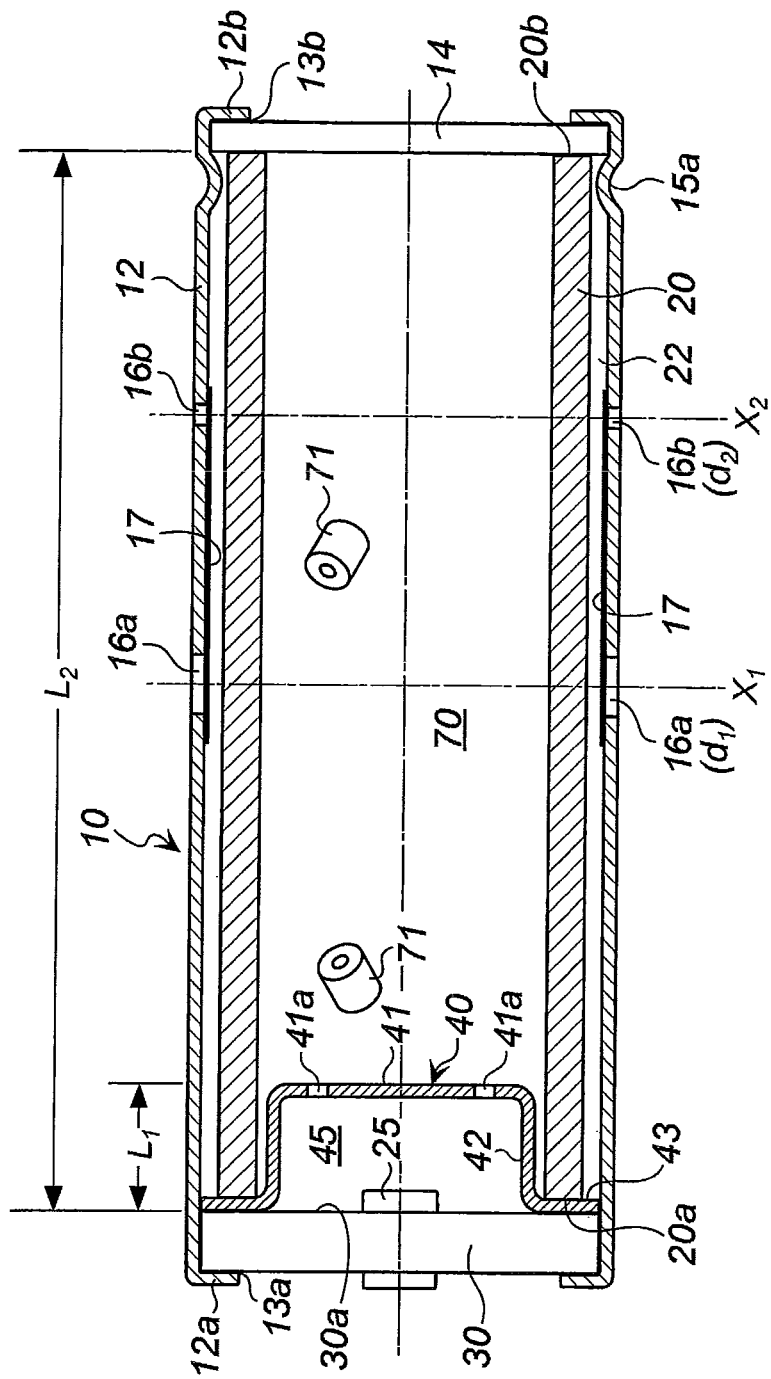
FIG. 1 shows an axial sectional view showing a gas generator according to the present invention.

In an inflator for a gas generator according to JP-A No. 6-183310, it is disclosed that a variation in environmental temperature is accommodated by associating orifice diameters with thicknesses of foils closing the orifices. However, since positions of the orifices are not associated together with the orifice diameters and thicknesses of the foils, there is room for improvement in terms of accommodating a variation in environmental temperature.

The present invention provides a gas generator capable of producing stable output pressure at a high level of reproducibility regardless of environmental temperature at activation.

The gas generators according to the first and second aspects of the present invention are suitably used in a restraining device installed in a vehicle and the like, such as an air bag apparatus.

The first aspect of the present invention may include the following first and second features:

According to the first feature, the opening pressure ($P_1$) of the first gas discharge port group and the opening pressure ($P_2$) of the second gas discharge port group are adjusted by any one of the following (a) to (c):

(a) The first gas discharge port group and the second gas discharge port group are closed by a same seal member and an opening diameter ($d_1$) of the first gas discharge port and an opening diameter ($d_2$) of the second gas discharge port satisfy a relationship of $d_1 > d_2$;

(b) The first gas discharge port group and the second gas discharge port group are closed by different seal members, a rupturing pressure ($p_1$) of the seal member closing the first gas discharge port group and a rupturing pressure ($p_2$) of the seal member closing the second gas discharge port group satisfy a relationship of $p_1 < p_2$; and (c) The first gas discharge port group and the second gas discharge port group satisfy relationships of $d_1 > d_2$ and $p_1 < p_2$.

According to the second feature, the ignition device includes an igniter fixed to the first closing member, a cup-like transfer charge chamber housing fixed so as to surround the igniter, and a transfer charge charged in the transfer charge chamber housing, a plurality of flame-transferring holes are formed on a bottom surface and a peripheral surface of the cup-like transfer charge chamber housing, the cup-like transfer charge chamber housing is fixed such that the cup-like transfer charge chamber housing covers the igniter from an opening thereof, and a length ($L_1$) from a surface of the first closing member to the bottom surface of the cup-like transfer charge chamber housing and a distance ($L_2$) between the first closing member and the second closing member in the axial direction satisfy a relationship of $L_1 < 0.4 L_2$.

The second aspect of the present invention may include the following third and fourth features:

According to the third feature, the opening pressure ($P_1$) of the first gas discharge port group and the opening pressure ($P_2$) of the second gas discharge port group are adjusted by any one of the following (a) to (c):

(a) The first gas discharge port group and the second gas discharge port group are closed by a same seal member and an opening diameter ($d_1$) of the first gas discharge port and an opening diameter ($d_2$) of the second gas discharge port satisfy a relationship of $d_1 > d_2$;

(b) The first gas discharge port group and the second gas discharge port group are closed by different seal members, a rupturing pressure ($p_1$) of the seal member closing the first gas discharge port group and a rupturing pressure ($p_2$) of the seal member closing the second gas discharge port group satisfy a relationship of $p_1 < p_2$; and (c) The first gas discharge port group and the second gas discharge port group satisfy relationships of $d_1 > d_2$ and $p_1 < p_2$.

According to the fourth feature, the ignition device in the first combustion chamber includes an igniter fixed to the first closing member, a cup-like transfer charge chamber housing fixed so as to surround the igniter, and a transfer charge charged in the transfer charge chamber housing, a plurality of flame-transferring holes are formed on a bottom surface and a peripheral surface of the cup-like transfer charge chamber housing, the cup-like transfer charge chamber housing is fixed such that the cup-like transfer charge chamber housing covers the igniter from an opening thereof, and a length ($L_1$) from a surface of the first closing member to the bottom surface of the cup-like transfer charge chamber housing and a distance ($L_2$) between the first closing member and the second closing member in the axial direction satisfy a relationship of $L_1 < 0.4 L_2$.

It is known that the higher an environmental temperature is at activation, a gas generating agent inside a gas generator burns faster.

Consequently, even in a same gas generator, the higher the environmental temperature is at activation, the faster the combustion of the gas generating agent becomes and relatively the faster an airbag is expanded and deployed. And the lower the environmental temperature at activation is, the slower the combustion of the gas generating agent becomes and relatively the slower the airbag is expanded and deployed.

However, such a difference in an expansion and deployment speed of an airbag attributable to a difference in environmental temperature is not desirable from the perspective of protecting an occupant, and improvements are demanded. In particular, such a phenomenon conceivably becomes more prominent with types of tubular-type gas generators provided with a gas generating agent, combustion of which proceeds from one end to another end of the housing.

The gas generator according to the first aspect of the present invention solves the problem described above by (I) differentiating opening pressures of the gas discharge port groups, (II) differentiating positions of the gas discharge port groups having different opening pressures, and (III) adjusting an arrangement of all gas discharge ports in a tubular housing.

Regarding the requirement (I), any one of the following (a) to (c) can be applied to achieve that the opening pressure ($P_1$) of the first gas discharge port group and the opening pressure ($P_2$) of the second gas discharge port group satisfy a relationship of $P_1 < P_2$.

The opening pressure ($P_1$) of the first gas discharge port group is pressure necessary for cleaving or rupturing a seal member (for example, a metallic foil fixable with an adhesive, such as a metallic seal tape) that closes the first gas discharge port group.

The opening pressure ($P_2$) of the second gas discharge port group is pressure necessary for cleaving or rupturing a seal member (for example, a metallic foil fixable with an adhesive, such as a metallic seal tape) that closes the second gas discharge port group.

(a) The first gas discharge port group and the second gas discharge port group are closed by a same seal member and an opening diameter ($d_1$) of the first gas discharge port and an opening diameter ($d_2$) of the second gas discharge port satisfy a relationship of $d_1 > d_2$. When closed by a same seal member, the larger the opening diameter is, the lower the opening pressure becomes.

(b) The first gas discharge port group and the second gas discharge port group are closed by different seal members, a rupturing pressure ($p_1$) of the seal member closing the first gas discharge port group and a rupturing pressure ($p_2$) of the seal member closing the second gas discharge port group satisfy a relationship of $p_1<p_2$, and $d_1=d_2$ is satisfied. When the opening diameter is the same, the lower the rupturing pressure of the seal member is, the lower the opening pressure becomes.

The rupturing pressure ($p_1$) of the seal member and the rupturing pressure ($p_2$) of the seal member are determined by a material, a thickness and the like which the seal member originally has, specifically, are determined by tensile strength (for example, refer to JP-A No. 2003-191816).

(c) The first gas discharge port group and the second gas discharge port group satisfy relationships of $d_1>d_2$ and $p_1<p_2$.

Moreover, a third gas discharge port group having a different opening diameter can be further provided. The opening diameter of the third gas discharge port group can be set intermediate between $d_1$ and $d_2$ or set to be smaller than $d_2$.

In addition, a rupturing pressure of a seal member closing the third gas discharge port group can be set intermediate between $p_1$ and $p_2$ or set to be lower than $p_2$.

Furthermore, regarding the requirements (II) and (III), the first gas discharge port group is positioned at a center portion in the axial direction between the first closing member and the second closing member or a vicinity thereof, and the second gas discharge port group is positioned at a center portion in the axial direction between the first gas discharge port group and the first closing member or a vicinity thereof.

Furthermore, when providing the third gas discharge port group, the third gas discharge port group may be positioned at a center portion in the axial direction between the first gas discharge port group and the second gas discharge port group or a vicinity thereof.

Since an outer shell of the gas generator according to Invention 1 is a tubular housing, the shape of the gas generator is more elongated compared to a gas generator using a disk-like housing.

In the present invention, a ratio (L/D) of an outer diameter (D) and a length (L) of the tubular housing preferably exceeds 1, more preferably equals to or exceeds 2, and further preferably equals to or exceeds 3. While the upper limit of L/D is not particularly restricted, in a case of a gas generator for a restraining device installed in a vehicle and the like such as an air bag apparatus, from a practical standpoint, L/D is substantially restricted to what allows mounting inside a vehicle.

First, a case where an environmental temperature at activation is relatively low will be described.

In the gas generator according to the first aspect of the invention, since an igniter is fixed to the first closing member at one end, at activation of the igniter, combustion starts in a gas generating agent positioned near the igniter in the first closing member side and proceeds toward the second closing member.

Consequently, since a proportion of combustion gas, which exists in the first closing member side, is larger during an initial stage of combustion, pressure inside the combustion chamber (combustion pressure) becomes higher in the first closing member side and a pressure gradient is created in the housing.

When such a pressure gradient is created, the seal member exposed under a higher pressure and closing the first gas discharge port group with a larger opening diameter ($d_1$), is broken firstly, the first gas discharge port group is opened, and combustion gas is discharged.

When combustion gas is discharged from the first gas discharge port group in this manner, a flow of the combustion gas concentrates at the first gas discharge port group. Therefore, even if combustion proceeds to unburned gas generating agents and pressure inside the combustion chamber varies (rises), the seal member covering the second gas discharge port group is unlikely to rupture.

Consequently, the combustion gas is discharged only from the first gas discharge port group with the second gas discharge port group remaining closed, and since inner combustion pressure (pressure inside the combustion chamber) is maintained at a high level, combustion of the gas generating agent in the combustion chamber is promoted.

As described above, with a pressure gradient generated inside the combustion chamber 70 during the initial stage of combustion, the seal member, which covers the first gas discharge port group to be subjected to a higher pressure, is broken easily, and the seal member, which covers the second gas discharge port group to be subjected to a lower pressure and having a higher opening pressure, is not easily broken. As the result, a gas discharge port (the first gas discharge port group), which opens with a reliable reproducibility, and a gas discharge port (the second gas discharge port group), which does not open or not easily open, are obtained.

On the other hand, when the environmental temperature at activation is relatively high, since the burning rate of the gas generating agent increases, a greater amount of combustion gas is generated per unit time. Consequently, compared to the case where the environmental temperature at activation is relatively low, pressure of an entire interior of the combustion chamber at an initial stage of combustion increases and the pressure gradient decreases.

In such a case, the seal members covering the first gas discharge port group and the second gas discharge port group are cleaved and opened, and combustion gas is discharged from the first gas discharge port group and the second gas discharge port group. Therefore, an increase in the inner combustion pressure is suppressed and combustion of the gas generating agent is also suppressed.

By operating in the above described manner, a difference in output performance between low and high environmental temperatures at activation can be reduced. Therefore, when used as a gas generator for an air bag system, occupant protection performance can be maintained at a uniform high level even if environmental temperature differs.

In the gas generator according to the first aspect of the invention, the first gas discharge port group and the second gas discharge port group may also be arranged such that the opening diameter ($d_1$) of the first gas discharge port and the opening diameter ($d_2$) of the second gas discharge port are the same, all openings are closed, from the inside, by a seal member, and the opening pressure ($P_1$) of the seal member closing the first gas discharge port group and the opening pressure ($P_2$) of the seal member closing the second gas discharge port group satisfy a relationship of $P_1<P_2$.

This gas generator operates in the same manner as the gas generator according to Invention 1 described above and is capable of producing the same operational advantages.

The gas generator according to the first aspect of the invention may also be arranged such that the opening diameter ($d_1$) of the first gas discharge port and the opening diameter ($d_2$) of the second gas discharge port satisfy a relationship of $d_1>d_2$ and the opening pressure ($P_1$) of the seal member closing the first gas discharge port group and the opening pressure ($P_2$) of the seal member closing the second gas discharge port group satisfy a relationship of $P_1<P_2$.

By associating the opening diameters and the rupturing (opening) pressure of the seal members in this manner, output performance during combustion can be adjusted more efficiently.

Furthermore, in the gas generator according to the present invention, by using an ignition device with a specific structure in addition to the requirements (I) to (III) described above, the operational advantages described above can be further enhanced.

The gas generator according to Invention 4 is a dual-type gas generator including two combustion chambers arranged in the axial direction.

The gas generator according to the second aspect of the invention can be applied to a gas generator in which a combustion chamber to activate first has a larger capacity (or gas generation amount) (capacity of the first combustion chamber>capacity of the second combustion chamber), and to a gas generator in which capacities of the two combustion chambers are the same (capacity of the first combustion chamber=capacity of the second combustion chamber).

In this gas generator, the same structure as Invention 1 described above (the structure satisfying the requirements (I) to (III)) is applied to the first combustion chamber having a larger capacity. In addition, any one of the above (a) to (c) can be applied to implement the requirement (I).

A dual-type gas generator is capable of three type of operations, namely, a case where the ignition device of the first combustion chamber is activated first and the ignition device of the second combustion chamber is activated with a delay (a collision when traveling at an intermediate speed), a case where the ignition device of the first combustion chamber and the ignition device of the second combustion chamber are activated at the same time (a collision when traveling at high speed), and a case where only the ignition device of the first combustion chamber is activated (a collision when traveling at low speed). In any operational state, the same operational advantages as Invention 1 described above can be obtained in the first combustion chamber.

In the present invention, a ratio (L/D) of a diameter (D) and a length (L) of the tubular housing of a portion that forms the first combustion chamber preferably exceeds 1, more preferably equals to or exceeds 1.5, and further preferably equals to or exceeds 2.0. While the upper limit of L/D is not particularly restricted, in a case of a gas generator for a restraining device installed in a vehicle and the like such as an air bag apparatus, from a practical standpoint, L/D is substantially restricted to what allows mounting inside a vehicle.

Furthermore, in the gas generator according to the second aspect of the invention, by using an ignition device with a specific structure in the first combustion chamber, in addition to the requirements (I) to (III) described above, the operational advantages described above can be further enhanced.

The gas generator according to the present invention is capable of obtaining stable output performance despite of differences in environmental temperatures at activation.

Embodiments of Invention (1) Gas Generator Shown in FIG. 1

A gas generator according to the present invention will be described with reference to FIG. 1.

An outer shell container of a gas generator 10 is a tubular housing 12, and a plurality of gas discharge ports are formed on a peripheral wall surface of the tubular housing 12.

An opening 13*a* of the tubular housing 12 is closed by a disk-shaped first closing member (boss) 30. A known electric igniter 25 is attached to the first closing member 30 so as to penetrate a central portion of the first closing member 30.

A transfer charge chamber housing 40 is attached to the first closing member 30 so as to surround the igniter 25. An interior of the transfer charge chamber housing 40 corresponds to a transfer charge chamber 45, being charged with a known transfer charge or a known gas generating agent.

The transfer charge chamber housing 40 has a cup-like shape and includes a bottom surface 41, a peripheral surface 42, and a flange portion 43 formed on a peripheral edge of the opening. The flange portion 43 abuts against a surface 30*a* of the first closing member. A plurality of flame-transferring holes 41*a*, with a size that prevent leakage of the transfer charge or the gas generating agent, is formed on the bottom surface 41.

A length ($L_1$) from the surface 30*a* of the first closing member 30 to the bottom surface 41 of the transfer charge chamber housing and a distance ($L_2$) in the axial direction between the first closing member 30 and a second closing member 14 preferably satisfies a relationship of $L_1<0.4L_2$, and more preferably satisfies a relationship of $L_1<0.2L_2$. In the embodiment shown in FIG. 1, $L_1=0.16L_2$.

In the relationship between $L_1$ and $L_2$, the greater the length Li or, in other words, the closer the bottom surface 41 is to a second closing member 14, the more easily the entire gas generating agent 71 burns. However, in this case, a space in which the gas generating agent 71 is charged becomes smaller and a charge volume decreases. Conversely, the smaller the length $L_1$, or, in other words, the closer the bottom surface 41 is to the first closing member 30, the more difficult it becomes for the entire gas generating agent 71 to burn uniformly.

In consideration thereof, by satisfying the relationship between $L_1$ and $L_2$ described above, both combustion performance and a charge volume of the entire gas generating agent 71 are satisfied.

While the opening 13*b* of the tubular housing 12 is closed by the disk-shaped second closing member 14, a tubular housing 12 with the opening 13*b* closed in advance may also be used.

The interior of the tubular housing 12 corresponds to a combustion chamber 70 and a tubular filter 20 is arranged inside the tubular housing 12 so as to obtain a gap 22 between the tubular filter 20 and an inner peripheral wall of the tubular housing 12. The gas generating agent 71 is charged inside the tubular filter 20. Moreover, the gas generating agent 71 does not exist between the peripheral surface 42 of the transfer charge chamber housing and the tubular filter 20. In FIG. 1, L/D=3.5, where L denotes a length between an end portion 12*a* to an end portion 12*b*.

The tubular filter 20 provides cooling and filtering function for combustion gas of the gas generating agent 71 and also functions as a supporting member for the flange portion 43 of the transfer charge chamber housing.

An end surface 20*a* of the tubular filter 20 abuts against the flange portion 43, and an end surface 20*b* of the tubular filter 20 abuts against the second closing member 14. The tubular filter 20 is pressed (in other words, pressed with pressure) in the axial direction with the first closing member 30 by crimping (in other words, bending inward) the end portion 12*a*. The tubular filter is further pressed in the axial direction with the second closing member 14 by crimping of the end portion 12*b*. Therefore, the tubular filter 20 becomes a supporting member and the flange portion 43 is also pressed in the axial direction and is fixed.

In FIG. 1, an annular protrusion 15*a* is formed which protrudes inward at a side of the end portion 12*b* in the tubular housing 12. A position of the tubular filter 20 in the radial direction is determined by the annular protrusion 15a.

A sealing member such as an O-ring may be arranged, if necessary, between the first closing member 30 and the end portion 12a and between the second closing member 14 and the end portion 12b.

Gas discharge ports formed on a peripheral wall surface of the tubular housing 12 include a first gas discharge port group 16a having a plurality of first gas discharge ports (all having the same opening diameter) and a second gas discharge port group 16b having a plurality of second gas discharge ports (all having the same opening diameter).

The number of the first gas discharge ports in the first gas discharge port group 16a preferably ranges between 2 and 12 and more preferably ranges between 4 and 10.

The number of the second gas discharge ports in the second gas discharge port group 16b preferably ranges between 2 and 12 and more preferably ranges between 4 and 10.

In the first gas discharge port group 16a, all first gas discharge ports are formed at a central portion in the axial direction (a position equal to $1/2L_2$ and indicated by a line $X_1$) or a vicinity thereof between the first closing member 30 and the second closing member 14. With respect to a position of the first gas discharge port group 16a, the line $X_1$ may be consistent with each center of the gas discharge ports or the line $X_1$ may pass through the each range of the gas discharge ports.

By setting the position of the first gas discharge port group 16a to the line $X_1$, the gas generating agent 71 in the second closing member 14 side is burnt more easily. Alternatively, the first gas discharge port group 16a may be formed at a position slightly closer to the first closing member 30 or the second closing member 14 from the line $X_1$. For example, the first gas discharge port group 16a may be formed within the range of $0.8 \times 1/2L_2$ to $1.2 \times 1/2L_2$ from the surface 30a of the first closing member, with respect to $X_1$ (where $1/2L_2=X_1$) as the center of the range.

The second gas discharge port group 16b is formed at a center portion in the axial direction (in other words, on a line $X_2$) between the first gas discharge port group 16a (in other words, the line $X_1$) and the second closing member 14. With respect to a position of the second gas discharge port group 16b, the line $X_2$ may be consistent with each center of the gas discharge ports or the line $X_2$ may pass through each range of the gas discharge ports.

In accordance with the position of the first gas discharge port group 16a, the second gas discharge port group 16b may be positioned closer to the first closing member 30 or the second closing member 14 from the line $X_2$ (in the range of $0.8 \times 1/2L_2$ to $1.2 \times 1/2L_2$, with respect to $X_2$ as the center of the range).

With the first gas discharge port group 16a and the second gas discharge port group 16b, an opening diameter ($d_1$) of the first gas discharge port and an opening diameter ($d_2$) of the second gas discharge port satisfy a relationship of $d_1 > d_2$, and all ports are closed, from the inside, by a same metallic (made of aluminum or the like) seal tape 17. With the arrangements, the opening pressures for the first gas discharge port group 16a and the second gas discharge port group 16b ($P_1$ and $P_2$) are adjusted.

Moreover, since "a same seal tape" means seal tapes with a same rupturing pressure. So, even with different materials, thicknesses, and the like, it is considered the seal tapes to be the same as long as rupturing pressure is the same. The seal tape maybe a single seal tape as a whole, or two or more sheets of the same seal tape may be used.

While a ratio of $d_1$ and $d_2$ is preferably adjusted according to an amount of gas generated per unit time by the gas generating agent 71 or the like, the ratio of $d_1/d_2$ can be set in a range from 1.5 to 2.1.

Next, operations of the gas generator shown in FIG. 1 will be described.

A transfer charge in the transfer charge chamber 45 burns due to an activation of the igniter 25. At this point, combustion products (high-temperature gas and flames) pass through a flame-transferring hole 41a and ignite the gas generating agent 71 in the combustion chamber 70.

Combustion gas generated by combustion of the gas generating agent 71 is cooled and purified when passing through a filter 20, flows into the gap 22, breaks the seal tape 17, and is discharged from the gas discharge ports.

During this process, when the environmental temperature is relatively low (for example, an interior of an automobile in winter has a relatively low environmental temperature compared to an interior of an automobile in summer), the following operation takes place.

Upon activation of the igniter 25, flames and the like from the transfer charge chamber 45 blow out from the flame-transferring hole 41a and ignites and burns the gas generating agent 71. At this point, combustion of the gas generating agent 71 starts at the portion in the vicinity of the transfer charge chamber housing 40 and gradually proceeds toward the second closing member 14. Therefore, a pressure gradient is created inside the combustion chamber 70 in an initial stage of combustion.

In other words, since the larger portion of the combustion gas, which is generated by combustion of the gas generating agent 71, exists in the vicinity of the first closing member 30 during the initial stage of combustion, the pressure inside the combustion chamber (combustion pressure) becomes higher in the first closing member 30 side.

When such a pressure gradient is created, the seal tape 17, being exposed under a higher pressure and closing the first gas discharge port group 16a with a large opening diameter ($d_1$), is broken first, the first gas discharge port group 16a is opened, and combustion gas is discharged.

When the first gas discharge port group 16a is opened and combustion gas is discharged, a flow of the combustion gas tends to concentrate at the first gas discharge port group 16a. And the first gas discharge port group 16a and the second gas discharge port group 16b are formed separated from each other. Thereby, even if combustion proceeds to the unburned gas generating agent 71 and a pressure inside the combustion chamber 70 varies (rises), the seal tape 17 covering the second gas discharge port group 16b difficultly ruptures.

Consequently, the combustion gas is discharged only from the first gas discharge port group 16a with the second gas discharge port group 16b remaining closed, and since combustion pressure (pressure inside the tubular housing 12 during combustion) is maintained at a high level (a decrease in combustion pressure is suppressed), combustion of the gas generating agent 71 is promoted.

As described above, with the pressure gradient generated inside the combustion chamber 70 during the initial stage of combustion, the seal tape which covers the first gas discharge port group 16a to be subjected to a higher pressure and having a lower opening pressure is broken easily, and the seal tape which covers the second gas discharge port group 16b to be subjected to a lower pressure and having a higher opening pressure is not easily broken. As the result, a gas discharge port (the first gas discharge port group 16a) which opens with reliable reproducibility and a gas discharge port (the second gas discharge port group 16b) which does not open or not easily open are obtained.

On the other hand, when the environmental temperature is relatively high, since the burning rate of the gas generating agent 71 increases, a greater amount of combustion gas is generated per unit time. Consequently, the pressure of the entire interior of the combustion chamber 70 during the initial stage of combustion increases and the pressure gradient decreases.

In such a case, the seal tape 17 covering the second gas discharge port group 16b ruptures together with the seal tape 17 covering the first gas discharge port group 16a, the first gas discharge port group 16a and the second gas discharge port group 16b are opened, and combustion gas is discharged therefrom. As the result, an increase in combustion pressure is suppressed and combustion of the gas generating agent 71 is also suppressed.

As described above, the gas generator 10 shown in FIG. 1 is capable of further suppressing a variation in output performance due to a difference in environmental temperature or, in other words, reducing a difference in output performance between low and high environmental temperatures during activation. Therefore, when used as a gas generator for an air bag system, occupant protection performance can be maintained at a uniform high level even if environmental temperature differs.

In the gas generator 10 shown in FIG. 1, a third gas discharge port group (opening pressure $P_3$) with a different opening diameter can be further formed in addition to the first gas discharge port group 16a (opening pressure $P_1$) and the second gas discharge port group 16b (opening pressure $P_2$).

The third gas discharge port group (opening diameter $d_3$) can be formed between the first gas discharge port group 16a and the second gas discharge port group 16b such that a relationship of $d_1 > d_3 > d_2$ (a relationship of opening pressures of $P_1 < P_3 < P_2$) is satisfied), or the third gas discharge port group (opening diameter $d_3$) can be formed between the second gas discharge port group 16b and the second closing member 14 such that a relationship of $d_1 > d_2 > d_3$ (a relationship of opening pressures of $P_1 < P_2 < P_3$) is satisfied).

In order to achieve the same operational advantages as described above, the gas generator 10 shown in FIG. 1 can also be arranged such that the opening diameter ($d_1$) of the first gas discharge port and the opening diameter ($d_2$) of the second gas discharge port are the same and the rupturing pressure ($p_1$) of the seal tape 17a closing the first gas discharge port group 16a and the rupturing pressure ($p_2$) of the seal tape 17b closing the second gas discharge port group 16b satisfy a relationship of $p_1 < p_2$. With this arrangement, the opening pressures ($P_1$ and $P_2$) for the first gas discharge port group 16a and the second gas discharge port group 16b are adjusted.

In order to achieve the same operational advantages as described above, the gas generator 10 shown in FIG. 1 can also be arranged such that a relationship of $d_1 > d_2$ and a relationship of $p_1 < p_2$ are both satisfied. With this arrangement, the opening pressures ($P_1$ and $P_2$) for the first gas discharge port group 16a and the second gas discharge port group 16b are adjusted.

Figure 2:
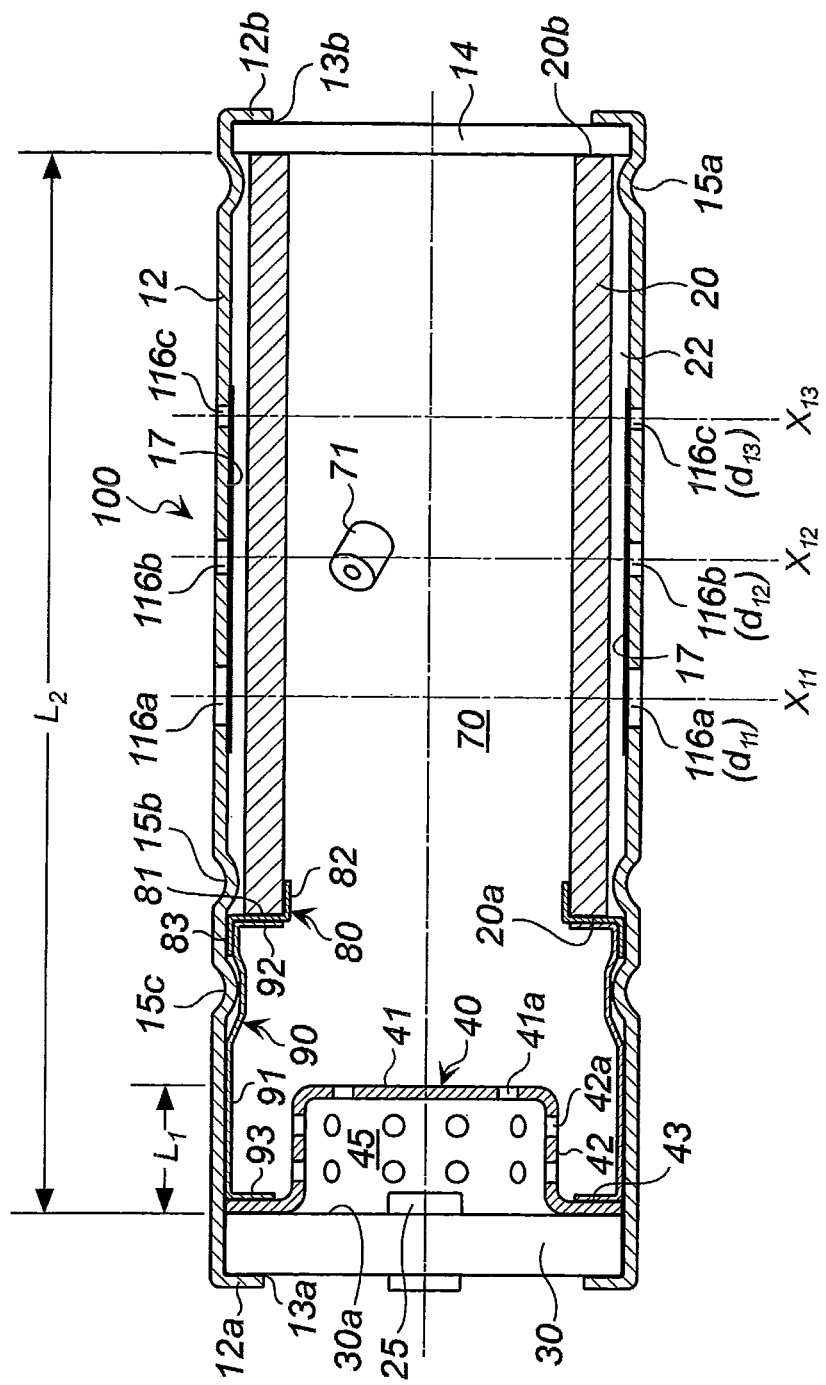
FIG. 2 shows an axial sectional view showing a gas generator according to another embodiment of the present invention.

(2) Gas Generator Shown in FIG. 2

A gas generator 100 according to another embodiment will be described with reference to FIG. 2.

The gas generator 100 shown in FIG. 2 differs from the gas generator 10 shown in FIG. 1 in that a tubular filter 20 and a tubular retainer including two members are used in combination and also differs in gas discharge ports. Expect for the above, the gas generator 100 shown in FIG. 2 is the same as the gas generator 10 shown in FIG. 1.

In the tubular filter 20, an end surface 20b abuts against a second closing member 14 and an end surface 20a is supported by a supporting member that is a combination of a retainer (or a first retainer) 80 and a spacer (or a second retainer) 90. Alternatively, the retainer 80 and the spacer 90 may be formed as a single tubular retainer.

The retainer 80 includes an annular plane surface 81, an annular inner circumferential surface 82 extending in the axial direction of the tubular housing 12 from an inner circumferential edge of the annular plane surface 81, and an annular outer circumferential surface 83 extending in the direction opposite to the annular inner circumferential surface 82 from an outer circumferential edge of the annular plane surface 81.

The annular plane surface 81 of the retainer 80 abuts against the end surface 20a of the filter 20 and the annular inner circumferential surface 82 of the retainer 80 abuts against an inner circumferential surface of the tubular filter 20.

The spacer 90 includes a peripheral wall portion 91, a first annular plane surface 92 formed at one end (in the tubular filter 20 side) of the peripheral wall portion 91 and a second annular plane surface 93 formed at the other end (in a first closing member 30 side) of the peripheral wall portion 91.

The peripheral wall portion 91 abuts against the inner circumferential surface of the tubular housing 12 and the annular outer circumferential surface 83, the first annular plane surface 92 abuts against the annular plane surface 81, and the second annular plane surface 93 abuts against a flange portion 43.

Two annular convex portions 15b and 15c that protrude inward are formed at an interval in the axial direction on the tubular housing 12. The annular outer circumferential surface 83 of the retainer 80 is positioned between the two annular convex portions 15b and 15c. Consequently, the retainer 80 and the spacer 90 combined with the retainer 80 are positioned. Moreover, as shown in the drawing, the peripheral wall portion 91 of the spacer at a portion opposing the annular convex portion 15c is depressed inward.

In the gas generator 100 shown in FIG. 2, a combination of the three members, i.e. the tubular filter 20, the retainer 80 and the spacer 90, functions as a supporting member of a transfer charge chamber housing 40 in the same manner as the tubular filter 20 shown in FIG. 1.

As described above, in the gas generator 100 shown in FIG. 2, a combination of three members functions as a supporting member and thereby the number of components is increased. However, an advantageous effect is obtained in that an exterior space around a peripheral surface 42 of the transfer charge chamber housing 40 is increased (a capacity of the combustion chamber 70 is increased), compared to the gas generator 10 shown in FIG. 1. Therefore, a charged amount of the gas generating agent 71 increases in proportion. In addition, for enhancing an ignition ability of the increased gas generating agent 71, in the gas generator 100 shown in FIG. 2, a flame-transferring hole 42a for discharging combustion products are also formed on the peripheral surface 42 of the transfer charge chamber housing 40.

Gas discharge ports formed on a peripheral wall surface of the tubular housing 12 includes a first gas discharge port group 116a including a plurality of first gas discharge ports (all having the same opening diameter), a second gas discharge port group 116b including a plurality of second gas discharge ports (all having the same opening diameter), and a third gas discharge port group 116c including a plurality of third gas discharge ports (all having the same opening diameter).

In the first gas discharge port group 116a, all first gas discharge ports are formed at a center portion in the axial direction (on a line $X_{11}$) between the second closing member 14 and the first closing member 30. The first gas discharge port group 116a may be positioned closer to the first closing member 30 or the second closing member 14 from the line $X_{11}$ (in the range of $0.8 \times 1/2L_2$ to $1.2 \times 1/2L_2$, with respect to $X_{11}$ (where $1/2L_2 = X_{11}$) as the center of the range). By setting the position of the first gas discharge port group 116a to the line $X_{11}$, the gas generating agent 71 in the second closing member 14 side can also be burnt more easily.

The third gas discharge port group 116c is formed at a center portion in the axial direction (in other words, on a line $X_{13}$) between the first gas discharge port group 116a (in other words, the line $X_{11}$) and the second closing member 14. In accordance with the positions of the first gas discharge port group 116a and the second gas discharge port group 116b, the third gas discharge port group 116c may be positioned closer to the first closing member 30 or the second closing member 14 from the line $X_{13}$ (in the range of $0.8 \times 1/2L_2$ to $1.2 \times 1/2L_2$, with respect to $X_{13}$ as the center of the range).

The second gas discharge port group 116b is formed at a center portion in the axial direction (in other words, on a line $X_{12}$) between the line $X_{11}$ and the line $X_{13}$. In accordance with the positions of the first gas discharge port group 116a and the third gas discharge port group 116c, the second gas discharge port group 116b may be positioned closer to the first closing member 30 or the second closing member 14 from the line $X_{12}$ (in the range of $0.8 \times 1/2L_2$ to $1.2 \times 1/2L_2$, with respect to $X_{12}$ as the center of the range).

The first gas discharge port group 116a, the second gas discharge port group 116b and the third gas discharge port group 116c may be positioned such that the line the line $X_{12}$, and the line $X_{13}$ are consistent with centers of the respective gas discharge ports, or that the line $X_{11}$, the line $X_{12}$, and the line $X_{13}$ pass through ranges of the respective gas discharge ports.

With the first gas discharge port group 116a, the second gas discharge port group 116b and the third gas discharge port group 116c, an opening diameter ($d_{11}$) of the first gas discharge port, an opening diameter ($d_{12}$) of the second gas discharge port and an opening diameter ($d_{13}$) of the third gas discharge port satisfy a relationship of $d_{11} > d_{12} > d_{13}$, and all ports are closed, from the inside, by a same metallic (made of aluminum or the like) seal tape. With this arrangement, the opening pressures ($P_1$, $P_2$ and $P_3$) of the first gas discharge port group 116a, the second gas discharge port group 116b and the third gas discharge port group 116c are adjusted.

Moreover, since "a same seal tape" means seal tapes having a same rupturing pressure, even with different materials, thicknesses and the like, it is considered the seal tapes to be the same as long as rupturing pressure is the same. The seal tape maybe a single seal tape as a whole, or two or more sheets of the same seal tape may be used.

While a ratio of $d_{11}$, $d_{12}$, and $d_{13}$ is preferably adjusted according to an amount of gas generated per unit time by the gas generating agent 71, or the like, the ratio of $d_{11}/d_{12}$ can be set in a range from 1.1 to 1.3 and the ratio of $d_{12}/d_{13}$ can be set in a range from 1.5 to 2.1. In the gas generator 100 shown in FIG. 2, $d_{11}$=3 mm, $d_{12}$=2.4 mm, and $d_{13}$=1.4 mm.

In accordance with environmental temperature, the gas generator 100 shown in FIG. 2 is capable of implementing:

an operational state where only the first gas discharge port group 116a is opened;

an operational state where the first gas discharge port group 116a and the second gas discharge port group 116b are opened; and an operational state where the first gas discharge port group 116a, the second gas discharge port group 116b, and the third gas discharge port group 116c are all opened.

Therefore, compared to the gas generator 10 shown in FIG. 1, output performance can be more finely adjusted in accordance with environmental temperature.

In order to achieve the same operational advantages as described above, the gas generator 100 shown in FIG. 2 can also be arranged such that the opening diameter ($d_{11}$) of the first gas discharge port, the opening diameter ($d_{12}$) of the second gas discharge port and the opening diameter ($d_{13}$) of the third gas discharge port are the same and a rupturing pressure ($p_{11}$) of a seal tape 117a closing the first gas discharge port group 116a, a rupturing pressure ($p_{12}$) of a seal tape 117b closing the second gas discharge port group 116b and a rupturing pressure ($p_{13}$) of a seal tape 117c closing the third gas discharge port group 116c satisfy a relationship of $p_{11} < p_{12} < p_{13}$. With this arrangement, the opening pressures ($P_1$, $P_2$ and $P_3$) of the first gas discharge port group 116a, the second gas discharge port group 116b and the third gas discharge port group 116c is adjusted.

In order to achieve the same operational advantages as described above, the gas generator 100 shown in FIG. 2 can also be arranged such that a relationship of $d_{11} > d_{12} > d_{13}$ and a relationship of $p_{11} < p_{12} < p_{13}$ are both satisfied. With this arrangement, a opening pressures ($P_1$, $P_2$ and $P_3$) of the first gas discharge port group 116a, the second gas discharge port group 116b, and the third gas discharge port group 116c is adjusted.

Figure 3:
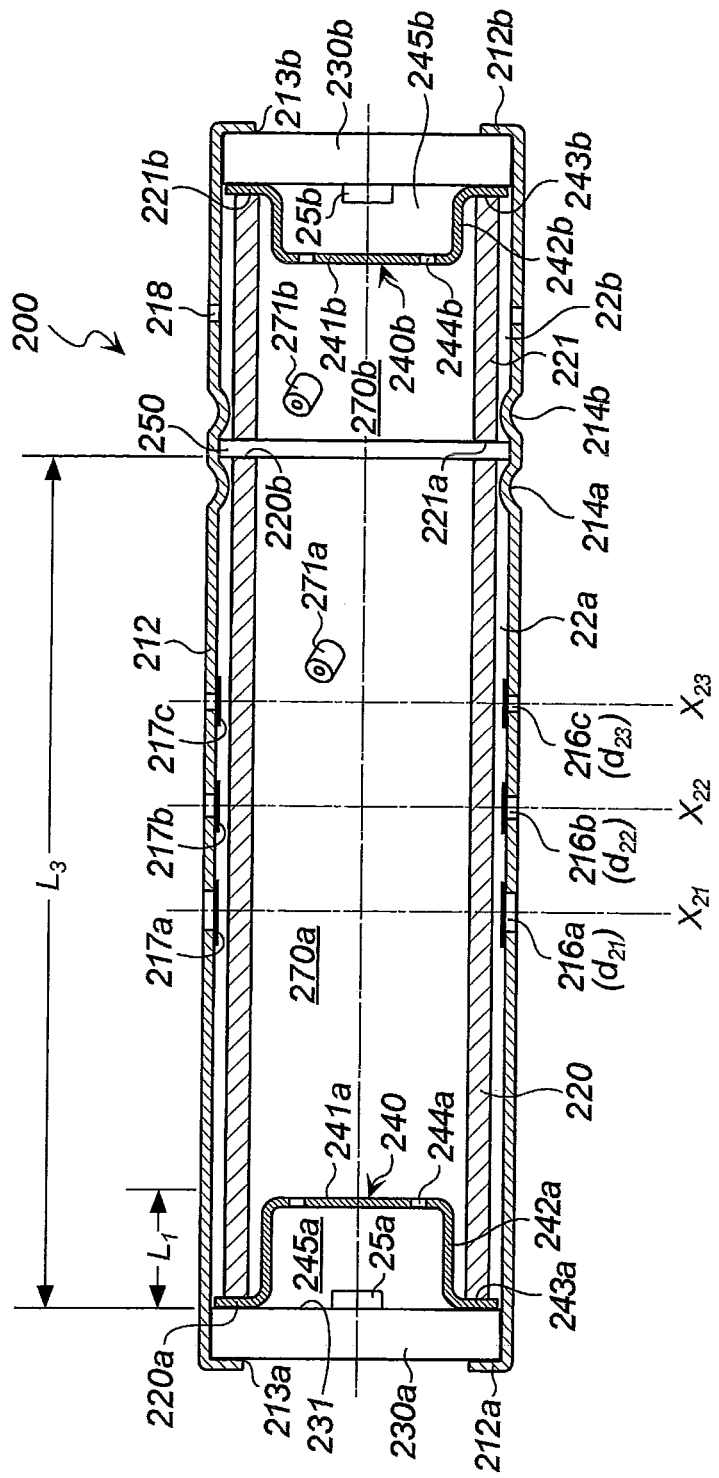
FIG. 3 shows an axial sectional view showing a gas generator according to yet another embodiment of the present invention.

(3) Gas Generator Shown in FIG. 3

A gas generator 200 according to another embodiment will be described with reference to FIG. 3. The gas generator 200 is a dual-type gas generator having two combustion chambers in which the structure shown in FIG. 1 is adopted for one of the combustion chambers.

An outer shell container of the gas generator 200 is a tubular housing 212. An interior of the tubular housing 212 is separated into two chambers in the axial direction by a partition plate (a partition member) 250. The partition plate 250 is positioned and pressed in the radial direction by two annular convex portions 214a and 214b formed on the tubular housing 212 at an interval so as to protrude inward.

A chamber in a first closing member 230a side becomes a first combustion chamber 270a charged with a first gas generating agent 271a and a chamber in a second closing member 230b side becomes a second combustion chamber 270b charged with a second gas generating agent 271b.

A diameter (D) and a length ($L = L_3$ shown in FIG. 3) of the tubular housing corresponding to the first combustion chamber 270a has a ratio (L/D) of 2.5.

A plurality of gas discharge ports (gas discharge ports having three different opening diameters) are formed in the circumferential direction on a peripheral wall surface of the tubular housing 212 facing the first combustion chamber 270a, and a plurality of gas discharge ports (having a same opening diameter) 218 are formed in the circumferential direction on a peripheral wall surface of the tubular housing 212 facing the second combustion chamber 270b.

An opening 213a in the first combustion chamber 270a side is closed by the first closing member (boss) 230a having a disk-like shape. A known electric igniter 25a is attached to the first closing member 230a so as to penetrate a central portion of the first closing member 230a.

A transfer charge chamber housing 240 is attached to the first closing member 230a so as to surround the igniter 25a. An interior of the transfer charge chamber housing 240 is a transfer charge chamber 245a charged with a known transfer charge or a known gas generating agent.

The transfer charge chamber housing 240 has a cup-like shape and includes a bottom surface 241a, a peripheral surface 242a, and a flange portion 243a formed on a peripheral edge of an opening. A plurality of flame-transferring holes 244a having a size that prevent leakage of the transfer charge or the gas generating agent are formed on the bottom surface 241a.

A length ($L_1$) from a surface 231 of the first closing member 230a to the bottom surface 241a of the transfer charge chamber housing and a distance ($L_3$) in the axial direction between the first closing member 230a and the partition plate 250 preferably satisfies a relationship of $L_1<0.4L_3$, and more preferably satisfies a relationship of $L_1<0.2L_3$. In the embodiment shown in FIG. 3, $L_1=0.13L_3$.

An interior of the first combustion chamber 270a serves as a combustion chamber, and a tubular filter 220 is disposed there to form a gap 22a with an inner peripheral wall surface of the tubular housing 212. Moreover, the first gas generating agent 271a does not exist in a space between a peripheral surface 242a of the transfer charge chamber housing and the tubular filter 220.

The tubular filter 220 cools and filters combustion gas from the first gas generating agent 271a and also serves as a supporting member for a flange portion 243a of the transfer charge chamber housing.

An end surface 220a of the tubular filter 220 abuts against the flange portion 243a, and an end surface 220b of the tubular filter 220 abuts against the partition plate 250. In addition, the tubular filter 220 is pressed (in other words, pressed with pressure) in the axial direction with the first closing member 230a by crimping (in other words, bending inward) an end portion 212a, and is further pressed against the partition plate 250. So, since the tubular filter 220 serves as a supporting member, the flange portion 243a is pressed in the axial direction and is fixed.

In FIG. 3, the tubular filter 220 is positioned in the radial direction by the annular convex portion 214a. A sealing member such as an O-ring may be arranged, if necessary, between the first closing member 230a and the end portion 212a.

An opening 213b at one end of the tubular housing 212 is closed by a second closing member 230b having a disk-like shape. A known electric igniter 25b is attached to the second closing member 230b so as to penetrate a central portion of the second closing member 230b.

A transfer charge chamber housing 240b is attached to the second closing member 230b so as to surround the igniter 25b. An interior of the transfer charge chamber housing 240b is a transfer charge chamber 245b charged with a known transfer charge or a known gas generating agent.

The transfer charge chamber housing 240b has a cup-like shape and includes a bottom surface 241b, a peripheral surface 242b, and a flange portion 243b formed on a peripheral edge of an opening. A plurality of flame-transferring holes 244b having a size that prevent leakage of the transfer charge or the gas generating agent are formed on the bottom surface 241b.

A tubular filter 221 is disposed inside the second combustion chamber 270b to form a gap 22b with an inner peripheral wall surface of the tubular housing 212. Since the second gas generating agent 271b does not exist in a space between the peripheral surface 242b of the transfer charge chamber housing and the tubular filter 221, the space substantially does not function as the second combustion chamber 270b.

The tubular filter 221 cools and filters combustion gas from the second gas generating agent 271b and also serves as a supporting member for the flange portion 243b of the transfer charge chamber housing.

An end surface 221a of the tubular filter 221 abuts against the partition plate 250, and an end surface 221b of the tubular filter 221 abuts against the flange portion 243b And, the tubular filter 221 is pressed (in other words, pressed with pressure) in the axial direction with the second closing member 230b by crimping (in other words, bending inward) an end portion 212b, and is also pressed against the partition plate 250. So, since the tubular filter 221 serves as a supporting member, the flange portion 243b is also pressed in the axial direction and is fixed.

In FIG. 3, the tubular filter 221 is positioned in the radial direction by the annular convex portion 214b. A sealing member such as an O-ring may be arranged, if necessary, between the second closing member 230b and the end portion 212b.

Gas discharge ports formed on a peripheral wall surface of the tubular housing 212 facing the first combustion chamber 270a includes a first gas discharge port group 216a having a plurality of first gas discharge ports (all having the same opening diameter), a second gas discharge port group 216b having a plurality of second gas discharge ports (all having the same opening diameter) and a third gas discharge port group 216c having a plurality of third gas discharge ports (all having the same opening diameter). The respective groups are closed, from the inside, by different seal tapes 217a, 217b, and 217c. These seal tapes are made of metallic (made of stainless steel or the like).

In the first gas discharge port group 216a, all first gas discharge ports are formed at a center portion in the axial direction (on a line $X_{21}$) between the first closing member 230a and the partition plate 250. The first gas discharge port group 216a may be positioned closer to the first closing member 230a or the partition member 250 from the line $X_{21}$ (in the range of $0.8\times1/2L_3$ to $1.2\times1/2L_3$, with respect to $X_{21}$ (where $1/2L_3=X_{21}$) as the center of the range). By setting the position of the first gas discharge port group 216a to the line $X_{21}$, the gas generating agent 271a in the partition member 250 side is burnt more easily.

The third gas discharge port group 216c is formed at a center portion in the axial direction (in other words, on a line $X_{23}$) between the first gas discharge port group 216a (in other words, the line $X_{21}$) and the partition plate 250. In accordance with the positions of the first gas discharge port group 216a and the second gas discharge port group 216b, the third gas discharge port group 216c may be positioned closer to the first closing member 230a or the partition member 250 from the line $X_{23}$ (in the range of $0.8\times\frac{1}{2}L_3$ to $1.2\times\frac{1}{2}L_3$, with respect to $X_{23}$ as the center of the range).

The second gas discharge port group 216b is formed at a center portion in the axial direction (in other words, on a line $X_{22}$) between the line $X_{21}$ and the line $X_{23}$. In accordance with the positions of the first gas discharge port group 216a and the third gas discharge port group 216c, the second gas discharge port group 216b may be positioned closer to the first closing member 230a or the partition member 250 from the line $X_{22}$ (in the range of $0.8\times1/2L_3$ to $1.2\times1/2L_3$, with respect to $X_{22}$ as the center of the range).

The first gas discharge port group 216a, the second gas discharge port group 216b and the third gas discharge port group 216c are positioned such that the line $X_{21}$, the line $X_{22}$ and the line $X_{23}$ are consistent with centers of the respective gas discharge ports, and that the line $X_{21}$, the line $X_{22}$ and the line $X_{23}$ pass through ranges of the respective gas discharge ports.

With the first gas discharge port group 216a, the second gas discharge port group 216b and the third gas discharge port group 216c, an opening diameter ($d_{21}$) of the first gas discharge port, an opening diameter ($d_{22}$) of the second gas discharge port and an opening diameter ($d_{23}$) of the third gas discharge port satisfy a relationship of $d_{21}>d_{22}>d_{23}$. With this arrangement, the opening pressures ($P_1$, $P_2$, and $P_3$) of the first gas discharge port group 216a, the second gas discharge port group 216b, and the third gas discharge port group 216c is adjusted.

While a ratio of $d_{21}$, $d_{22}$, and $d_{23}$ is preferably adjusted according to an amount of gas generated per unit time by the gas generating agent 71 or the like, the ratio of $d_{21}/d_{22}$ can be set in a range from 1.1 to 1.3 and the ratio of $d_{22}/d_{23}$ can be set in a range from 1.5 to 2.1. In the gas generator 200 shown in FIG. 3, $d_{21}$=3 mm, $d_{22}$=2.4 mm, and $d_{23}$=1.4 mm.

A rupturing pressure $p_{21}$ of the seal tape 217a closing the first gas discharge port group 216a, a rupturing pressure $p_{22}$ of the seal tape 217b closing the second gas discharge port group 216b and a rupturing pressure $p_{23}$ of the seal tape 217c closing the third gas discharge port group 216c satisfy a relationship of $p_{21}<p_{22}<p_{23}$. With this arrangement, the opening pressures ($P_1$, $P_2$, and $P_3$) of the first gas discharge port group 216a, the second gas discharge port group 216b and the third gas discharge port group 216c are adjusted.

In the gas generator 200 shown in FIG. 3, with reference to $p_{21}$, $p_{22}$ is set to be 1.7 times as much as $p_{21}$ and $p_{23}$ is set to be 2.1 times as much as $p_{21}$.

In accordance with a variation in environmental temperature, the gas generator 200 shown in FIG. 3 is capable of implementing:

an operational state where only the first gas discharge port group 216a is opened;

an operational state where the first gas discharge port group 216a and the second gas discharge port group 216b are opened; and an operational state where the first gas discharge port group 216a, the second gas discharge port group 216b and the third gas discharge port group 216c are all opened.

Therefore, compared to the gas generator 10 shown in FIG. 1, output performance can be more finely adjusted in accordance with environmental temperature. In particular, in the gas generator 200 shown in FIG. 3, since opening pressure is adjusted by both opening diameters and rupturing pressure of the seal tape, further finer adjustment of output performance can be achieved.

The gas generators shown in FIGS. 1 to 3 described above are all suitable as a gas generator to be used in air bag system for a passenger side next to a driver.

The invention thus described, it will be obvious that the same may be varied in many ways. Such variations are not to be regarded as a departure from the sprit and scope of the invention, and all such modifications as would be obvious to one skilled in the art are intended to be included within the scope of the following claims.

The invention claimed is:

1. A gas generator comprising:
a tubular housing having both ends closed and a gas discharge port on a circumferential surface, and forming an outer shell of the gas generator,
a first closing member having an ignition device fixed thereto and closing one end of the tubular housing, a second closing member closing another end of the tubular housing, and a partition member dividing a space between the first closing member and the second closing member,
among spaces divided by the partition member, a space that is closer to the first closing member and the ignition device, serving as a first combustion chamber charged with a first gas generating agent, a space that is closer to the second closing member, serving as a second combustion chamber charged with a second gas generating agent, the spaces satisfying a relationship where capacity of the first combustion chamber≧capacity of the second combustion chamber,
the gas discharge port, that is formed in a side of the first combustion chamber, including at least two gas discharge port groups,
the at least two gas discharge port groups including a first gas discharge port group formed in the circumferential direction of the tubular housing and closed, from the inside, by a seal member, and a second gas discharge port group separated axially from the first gas discharge port group, formed in the circumferential direction of the tubular housing and closed, from the inside, by a seal member,
a transfer charge chamber housing being a cup-like shape and including a plurality of flame-transferring holes formed in a bottom surface thereof, the transfer charge chamber housing being provided so as to surround the ignition device, such that, upon activation of the gas generator, a pressure gradient is created in an axial direction of the housing within the first combustion chamber where a pressure at an area closer to the first closing member is higher than a pressure at an area closer to the partition member,
pressure (opening pressure $P_1$), that is necessary for opening the first gas discharge port group, and pressure (opening pressure $P_2$), that is necessary for opening the second gas discharge port group, satisfying a relationship of $P_1<P_2$,
the first gas discharge port group being positioned at a center portion in the axial direction between the first closing member and the partition member, or in the vicinity thereof, and
the second gas discharge port group being positioned at a center portion in the axial direction between the first gas discharge port group and the partition member, or in the vicinity thereof.

2. A gas generator according to claim 1, wherein the opening pressure ($P_1$) of the first gas discharge port group and the opening pressure ($P_2$) of the second gas discharge port group are adjusted by any one of the following (a) to (c):
(a) The first gas discharge port group and the second gas discharge port group are closed by a same seal member and an opening diameter ($d_1$) of the first gas discharge port and an opening diameter ($d_2$) of the second gas discharge port satisfy a relationship of $d_1>d_2$;
(b) The first gas discharge port group and the second gas discharge port group are closed by different seal members, a rupturing pressure ($p_1$) of the seal member closing the first gas discharge port group and a rupturing pressure ($p_2$) of the seal member closing the second gas discharge port group satisfy a relationship of $p_1<p_2$; and
(c) The first gas discharge port group and the second gas discharge port group satisfy relationships of $d_1>d_2$ and $p_1<p_2$.

3. A gas generator according to claim 1, wherein
the ignition device in the first combustion chamber includes an igniter fixed to the first closing member, and a transfer charge charged in the transfer charge chamber housing,
the plurality of flame-transferring holes are also formed in a peripheral surface of the transfer charge chamber housing,
the transfer charge chamber housing is fixed such that the transfer charge chamber housing covers the igniter from an interior of the tubular housing, and
a length ($L_1$) from a surface of the first closing member to the bottom surface of the transfer charge chamber housing and a distance ($L_3$) between the first closing member and the partition member in the axial direction of the housing satisfy a relationship of $L_1 < 0.4 L_3$.

\* \* \* \* \*